(12) United States Patent
Kersey et al.

(10) Patent No.: US 8,554,513 B2
(45) Date of Patent: Oct. 8, 2013

(54) METHOD OF TESTING AND PROVING FUEL EFFICIENCY IMPROVEMENTS

(75) Inventors: Victor Lee Kersey, Ashland, KY (US); Adam E. Sworski, Catlettsburg, KY (US); Timothy L. Caudill, Catlettsburg, KY (US); Joshua Frederick, Lexington, KY (US); Tom Bidwell, Delaware, OH (US); Frances Lockwood, Georgetown, KY (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 201 days.

(21) Appl. No.: 12/914,414

(22) Filed: Oct. 28, 2010

(65) Prior Publication Data
US 2012/0109579 A1    May 3, 2012

(51) Int. Cl.
G06F 11/30    (2006.01)

(52) U.S. Cl.
USPC ............... 702/182; 702/50; 702/108; 702/90

(58) Field of Classification Search
USPC ............................................ 702/50, 90, 182
See application file for complete search history.

(56) References Cited

U.S. PATENT DOCUMENTS

| | | | |
|---|---|---|---|
| 5,044,334 A * | 9/1991 | Bedi ........................ | 123/196 R |
| 7,448,260 B2 * | 11/2008 | Pividori et al. ............ | 73/114.52 |
| 7,684,917 B2 * | 3/2010 | Furuno et al. ................... | 701/50 |
| 8,181,829 B2 * | 5/2012 | Nobusawa .................... | 222/323 |
| 2002/0061506 A1 | 5/2002 | Catten et al. | |
| 2002/0178780 A1 * | 12/2002 | Van Mullekom et al. ........ | 73/10 |
| 2005/0137763 A1 * | 6/2005 | Watkins et al. .................. | 701/33 |
| 2007/0052241 A1 * | 3/2007 | Pacy ............................. | 290/1 R |
| 2008/0252487 A1 | 10/2008 | McClellan et al. | |
| 2008/0255722 A1 | 10/2008 | McClellan et al. | |
| 2008/0258890 A1 | 10/2008 | Follmer et al. | |
| 2008/0319604 A1 | 12/2008 | Follmer et al. | |
| 2009/0009321 A1 | 1/2009 | McClellan et al. | |
| 2009/0024273 A1 | 1/2009 | Follmer et al. | |
| 2009/0024419 A1 | 1/2009 | McClellan et al. | |
| 2009/0085728 A1 | 4/2009 | Catten et al. | |
| 2009/0177336 A1 | 7/2009 | McClellan et al. | |
| 2010/0035632 A1 | 2/2010 | Catten | |
| 2011/0130914 A1 * | 6/2011 | Shah et al. ...................... | 701/30 |

OTHER PUBLICATIONS

Parsons J. B., The Effects of an Iron Based Fuel Catalyst upon Diesel Fleet Operation, 1983, SAE Technical Paper 8312304.*
Lieber Richard L., Statistical Significance and Statistical Power in Hypothesis Testing, 1990, Journal of Orthopaedic Research.*

* cited by examiner

*Primary Examiner* — Marc Armand
*Assistant Examiner* — Ivan Rabovianski
(74) *Attorney, Agent, or Firm* — Wood, Herron & Evans, LLP

(57) ABSTRACT

A method of testing and proving fuel efficiency improvements includes installing a telematic device in each of a first plurality of vehicles and a second plurality of vehicles. The telematic devices collect baseline fuel consumption data during a first time period and collect test fuel consumption data during a second time period. Between the first and second time periods, at least one operating parameter of the second plurality of vehicles is modified such that the baseline fuel consumption data and the test fuel consumption data can be analyzed to determine any fuel efficiency improvements caused by the modified operating parameter. To ensure reliable and statistically-significant results, each plurality of vehicles may include 15 vehicles and each time period may include 60 days.

19 Claims, 9 Drawing Sheets

Up To 4% Fuel Economy Limited GUARANTEE

FUEL PROOF GUARANTEE

First Year Cost Savings Estimator

| Fleet Information | | |
|---|---|---|
| Number of Trucks | Quantity | 100 |
| Annual Travel/Truck | Mile | 100,000 |
| Annual Insurance Cost/Truck | US Dollar | 5,000 |
| Engine Oil Sump Size | Gallon | 12.00 |
| Gear Oil Sump Size | Gallon | 10.00 |
| Current Engine Oil Drain Interval | Mile | 25,000 |
| Premium Blue® Extreme Drain Interval | Mile | 30,000 |

| Oil Information | | |
|---|---|---|
| Comparison Oil: | | Cost |
| Shell Rotella T 15W-40 | US Dollar/Gallon | 8.50 |
| Valvoline Oil: | | Cost |
| Premium Blue® Extreme 5W-40[4] | US Dollar/Gallon | 12.84 |
| Syn Gard™ FE 75W-90[2,4] | US Dollar/Gallon | 20.00 |

| tiwi™ Information | | |
|---|---|---|
| Hardware Cost | Down Payment (US Dollar/Gallon) | 299.99 |
| | Loan Duration (Years) | 3 |
| | Monthly Payment (US Dollar/Gallon) | 10.00 |
| Monthly Access Fee | US Dollar/Truck/Month | 29.99 |

| Fuel Information | | |
|---|---|---|
| Current Fuel Cost | US Dollar/Gallon | 2.81 |
| Fuel Proof Enhancement | % | 2.8% |
| Current Fuel Economy | Mile/Gallon | 5.80 |
| Enhanced Fuel Economy | Mile/Gallon | 5.96 |

| Year-1 Fuel Proof Summary[1,3] | |
|---|---|
| Values in US Dollar | |
| Total Fuel Proof Package Cost/Yr | 108,547 |
| Fleet Fuel Savings/Yr | 133,793 |
| Potential Fuel Proof Package Savings/Yr | 25,246 |

Comments:
1. Annual savings will *increase* in subsequent years, once tiwi™ hardware is fully paid-for.
2. Cost of Syn Gard™ FE 75W-90 gear oil is compared to zero-cost of retaining original gear oil.
3. Calculations exclude labor costs associated with fluid changes and hardware installation.
4. Current lubrication costs will be provided by your Valvoline representatives.

FIG. 4

METHOD OF TESTING AND PROVING FUEL
EFFICIENCY IMPROVEMENTS

TECHNICAL FIELD

This invention relates to a method of testing modifications of operating parameters in a fleet of vehicles to determine and prove statistically-significant fuel efficiency improvements caused by the modified operating parameters.

BACKGROUND

In the management of trucking fleets, the largest cost of running the vehicles is typically the fuel expenditure. According to the American Transportation Research Institute, fuel costs generally exceed all other marginal expenses when operating a vehicle, including driver salaries and benefits. By one estimate, the fuel costs approach 40% of the total marginal expenses incurred while operating a fleet of vehicles. Therefore, the vast majority of technical developments in the trucking field pertain to improving fuel efficiency. As well understood in the art, fuel efficiency is affected by a high number of factors, including engine design, engine lubrication, driver behavior, and aerodynamic design of the vehicle. Consequently, there is nearly an infinite number of methods possible for improving the fuel efficiency and profitability of a trucking fleet.

In this regard, substantial numbers of products related to the trucking industry are advertised as improving fuel efficiency. While the Federal Trade Commission does regulate such advertisements for accuracy and truthfulness, any kind of laboratory testing of a product may be used to support claims that fuel efficiency is improved by using that product. Therefore, many products that show minor fuel efficiency improvements in a laboratory setting may be marketed as improving fuel efficiency even if that product shows no true fuel efficiency benefits in actual over-the-road use. With nearly every product being marketed as improving fuel efficiency, trucking fleet operators are forced to heed lightly or ignore the advertised claims for all products when deciding which fuels, lubricants, tires, and other products (hereinafter referred to as "operating parameters") to use on a trucking fleet.

Nonetheless, there remains a strong need to truly test products for significant fuel efficiency improvements such that trucking fleet operators can reduce marginal operating costs and improve profitability. One well-accepted standard test procedure for fuel efficiency improvement is the TMC RP1102 Type II/SAE J1321 test procedure jointly developed by the American Trucking Association-Technology & Maintenance Council/Society of Automotive Engineers (TMC/SAE) Task Force for In-Service Test Procedures of The American Trucking Industry. The SAE J1321 test procedure provides tightly-controlled laboratory-type tests on actual interstate conditions to ensure that any fuel efficiency improvements detected are accurate and repeatable in the field. Still, uninformed customers in the marketplace are typically unable to distinguish between fuel efficiency claims verified by SAE J1321 testing, and those claims founded in less rigorous test methods. The result is a natural skepticism towards all fuel efficiency claims.

Consequently, it would be desirable to provide an improved method of testing and proving fuel efficiency improvements in the field as caused by modifying the operating parameters of a fleet of vehicles.

SUMMARY

According to one embodiment of the present invention, a method for testing and proving fuel efficiency improvements caused by a modification of at least one operating parameter in a vehicle includes installing a telematic device in each of a first plurality of vehicles and in each of a second plurality of vehicles. Each telematic device is configured to receive fuel consumption data from a vehicle's engine control module. The method includes collecting baseline fuel consumption data for the first and second pluralities of vehicles during a first time period. At least one operating parameter is then modified in the second plurality of vehicles after the first time period. The method also includes collecting test fuel consumption data for the first and second pluralities of vehicles during a second time period. The baseline fuel consumption data and the test fuel consumption data are then analyzed to determine any fuel efficiency improvements in the second plurality of vehicles over the second time period caused by modifying the at least one operating parameter. Modifying the at least one operating parameter includes changing one or more vehicle lubricants used in the second plurality of vehicles.

The total number of vehicles in the first and second pluralities of vehicles and the length of the first and second time periods may be selected to ensure that statistically-significant fuel efficiency improvements are determined at a 95% confidence level and a Power level of at least 0.6. For example, each of the first and second pluralities of vehicles may include 15 vehicles, and each of the first and second time periods may include 60 days. The statistical analysis and reasoning behind selecting 15 vehicles and 60 days will be explained in further detail below. Applying the modified operating parameters to 15 vehicles over 60 days reduces the effect of many statistical outliers caused by uncontrolled variables such as changing weather and road conditions, different driver behavior, and different maintenance histories of the vehicles used. Thus, confirmed test results can prove that a statistically significant increase in fuel efficiency is possible in over 60% of test runs at an industry-standard 95% confidence level.

In some embodiments, modifying the at least one operating parameter may further include activating a driver mentoring program on a driver mentoring device located in the second plurality of vehicles. Modifying the operating parameter may also include changing a gear oil used in the second plurality of vehicles, or changing a transmission fluid used in the second plurality of vehicles. The at least one operating parameter may further be modified by applying a fuel additive to the second plurality of vehicles, or changing a grease used in the second plurality of vehicles. The telematic devices may also collect additional information from the vehicle's engine control module such that other improvements may be tested and proven, including emissions reductions caused by modifying the operating parameters of the vehicle.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 4 is a view of the Return-On-Investment Calculator provided by the system of FIG. 1 and used with the method of FIG. 2 to report fuel efficiency improvements and associated cost savings.

DETAILED DESCRIPTION

Figure 1:
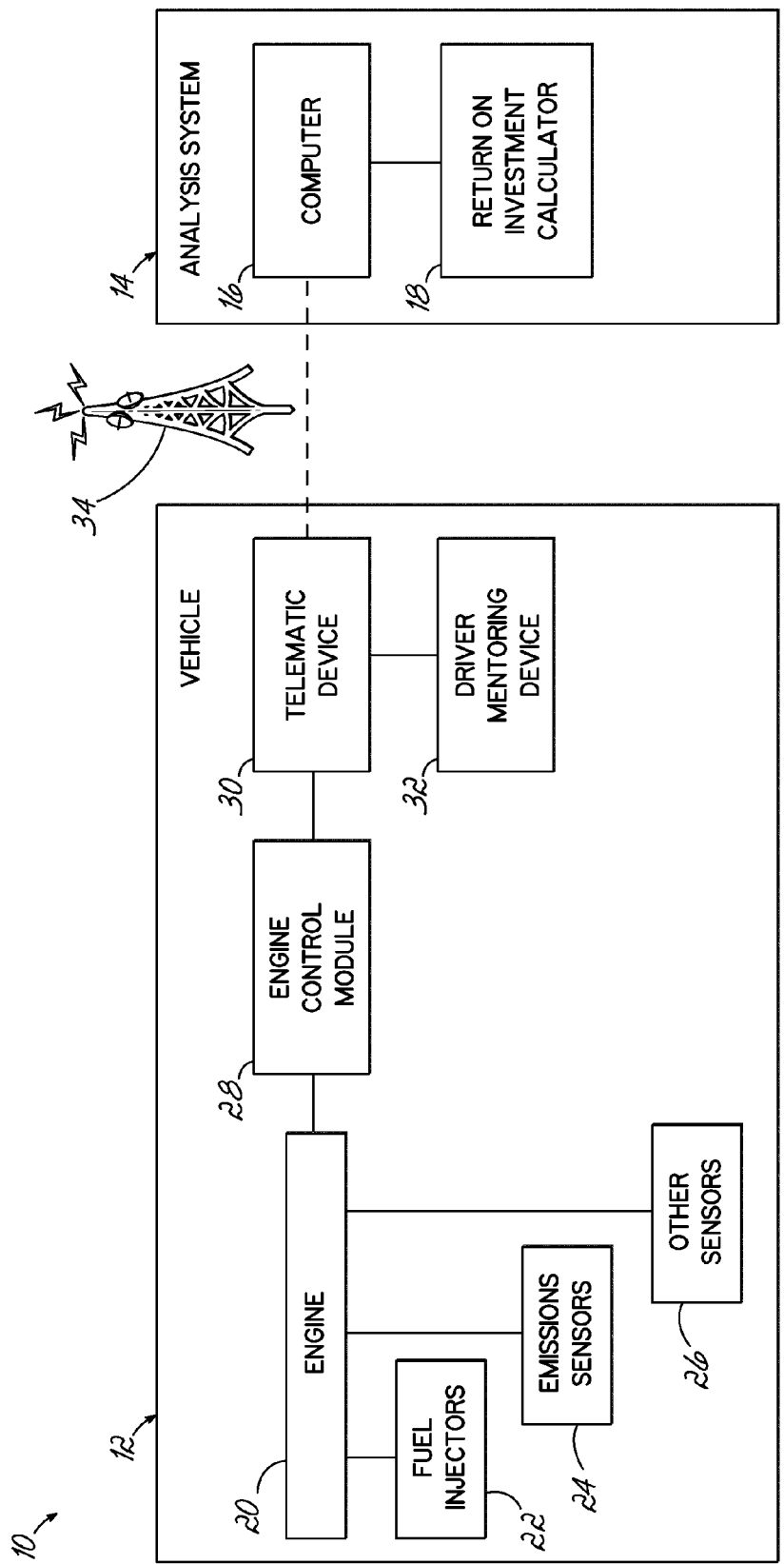
FIG. 1 is a schematic view of a system configured to perform the method of the present invention.
Figure 2:
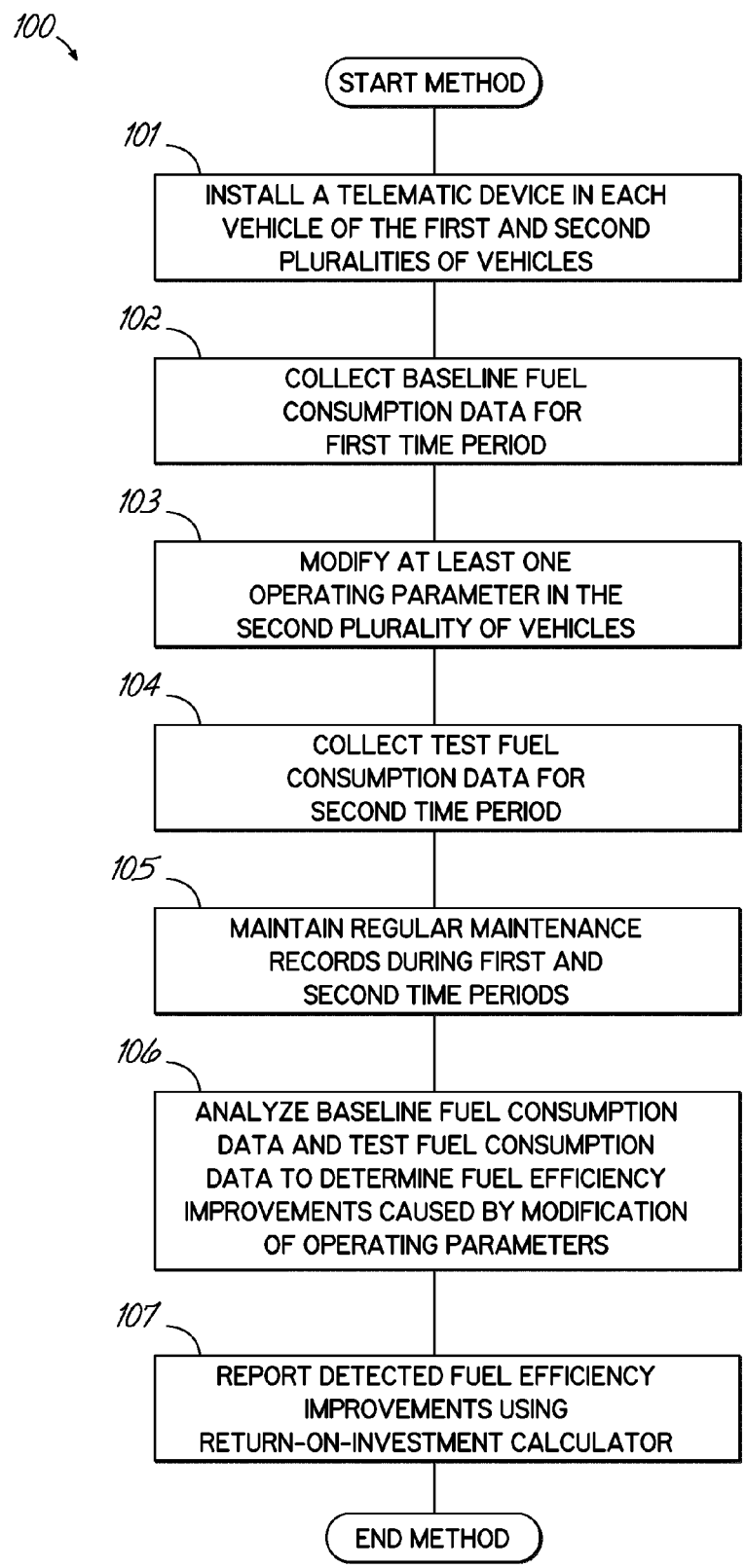
FIG. 2 is a flowchart illustrating one embodiment of the method performed by the system of FIG. 1.
Figure 3:
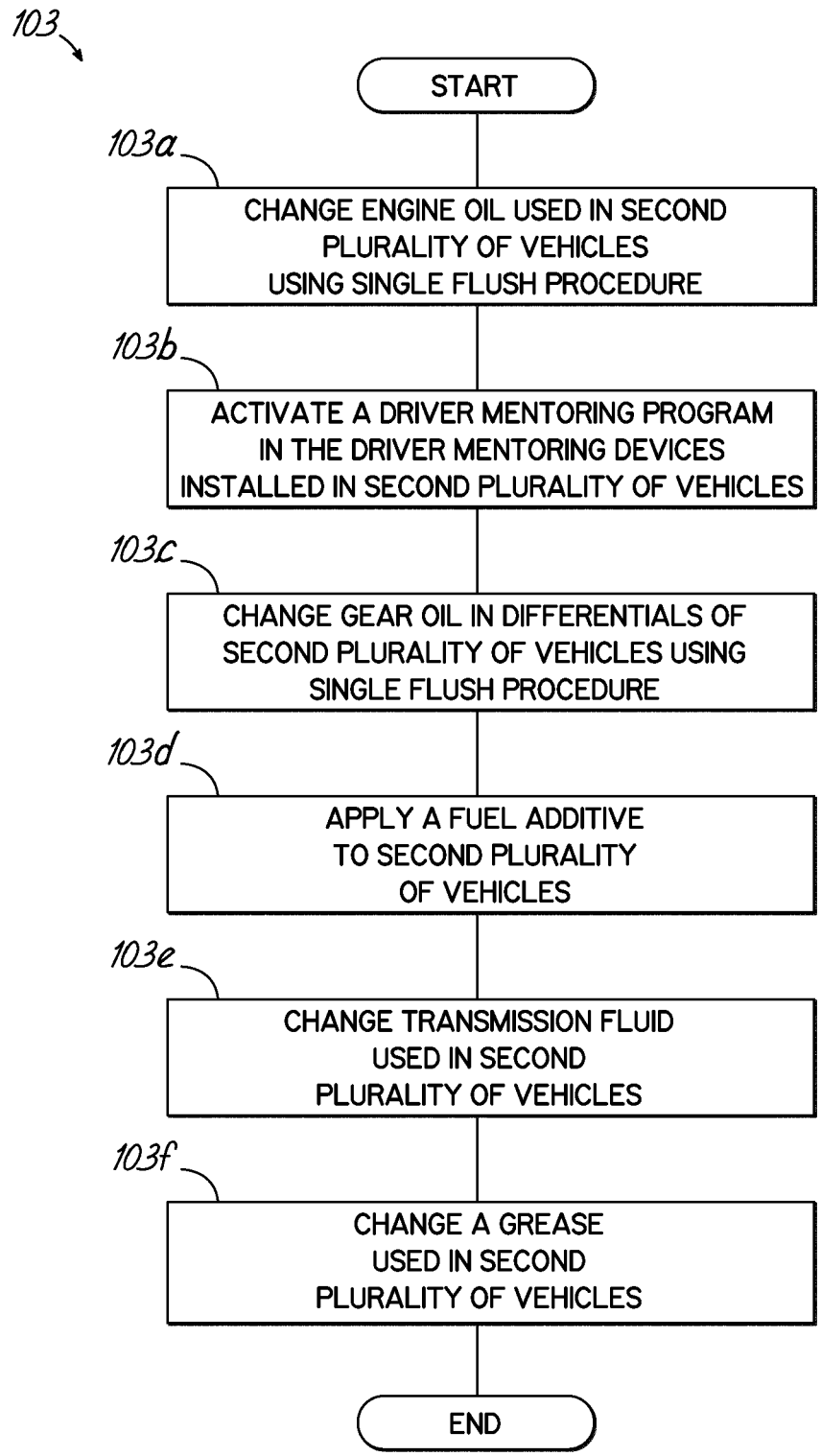
FIG. 3 is a flowchart illustrating the modifying step of the method of FIG. 2.

FIGS. 1-3 illustrate a system 10 and one embodiment of a method 100 for testing and proving fuel efficiency improvements caused by the modification of at least one operating parameter in a fleet of vehicles 12. It will be understood that "operating parameters" refer to any vehicle-based or engine-based product that affects fuel efficiency of the vehicle 12, including but not limited to lubricants, greases, additives, fuels, tires, and aerodynamic drag-reducing equipment. The system 10 includes at least one vehicle 12 and an analysis system 14 as shown in FIG. 1. The analysis system 14 includes a computer 16 configured to run software programs that receive and analyze various types of data including but not limited to fuel consumption data. The computer 16 is also configured to produce a Return-On-Investment Calculator 18 for reporting test results to a fleet owner or operator from the analyses of the various types of data, as explained in further detail below.

The vehicle 12 includes an engine 20 having a plurality of engine components and sensors, such as fuel injectors 22, emissions sensors 24, and other sensors 26 for measuring dynamic operational states of the engine 20. An electronic engine control module (ECM) 28 is operatively coupled to the engine 20 so as to receive data broadcast from the engine components and sensors. For example, the engine control module 28 receives information from the fuel injectors 22 on how much fuel is being consumed in the engine 20, and also receives information from the emissions sensors 24 on the level of undesirable exhaust emissions being produced by the engine 20. In accordance with the present invention, the vehicle 12 may also include a telematic device 30 configured to receive at least a portion of the data monitored by the engine control module 28. The telematic device 30 is coupled to the engine control module 28 through a SAE diagnostics port on the vehicle data bus, or alternatively the telematic device 30 may receive data wirelessly from the engine control module 28. The telematic device 30 may include a driver mentoring device 32 as explained in further detail below. The telematic device 30 collects data from the engine control module 28 via the vehicle data bus and can communicate these data directly to the computer 16 of the analysis system 14 via wireless communication (illustrated schematically with antenna 34 in FIG. 1). It will be appreciated that other methods of communicating the collected data to the computer 16 may be used within the scope of this invention.

FIG. 2 schematically illustrates the first embodiment of the method 100 operated by the system 10. The method 100 begins with installing the telematic devices 30 into each of a first plurality of vehicles and a second plurality of vehicles, at step 101. The first plurality of vehicles and the second plurality of vehicles each include the same number of vehicles for comparison purposes. Each of the first and second pluralities of vehicles should be composed of consistent vehicle configurations, or at least a consistent mix of vehicle configurations in both pluralities. In this regard, a similar mix of drivers, delivery routes, and loads should be used in each plurality of vehicles to minimize the impact of any unusual disparities that may distort an analysis of fuel efficiency. In one example, each vehicle 12 in the first and second plurality of vehicles may be less than 8 years old and have more than 100,000 miles prior to starting the method 100.

As previously described, the telematic device 30 installed in each vehicle 12 may include a driver mentoring device 32. The telematic device 30 is configured to receive various types of data, including fuel consumption data, broadcast on the vehicle data bus by the corresponding engine control module 28. One example of a telematic device 30 that may be used in the system 10 is the tiwiPRO device, commercially available from Inthinc, Inc., of West Valley City, Utah, and disclosed in U.S. Patent Publication No. 2008/0319602. The tiwiPRO device is also configured to perform a driver mentoring program, as explained in further detail below. The telematic device 30 may collect data from the engine control module 28 and periodically deliver the collected data via wireless network or other methods to a central server, from which the computer 16 can access the collected data for analysis.

Thus, after the telematic devices 30 have been installed in each of the vehicles 12, a "baseline phase" or first time period begins. During this first time period, the telematic devices 30 collect baseline fuel consumption data broadcast by the corresponding engine control modules 28, at step 102. For example, an engine control module 28 may monitor the instantaneous fuel flow rates through the fuel injectors 22 and broadcast that instantaneous fuel flow rate to the telematic device 30. The engine control module 28 may also monitor the distance traveled by the vehicle 12 over the first time period such that the telematic device 30 receives all of the information necessary to calculate fuel consumption or fuel efficiency. The telematic device 30 may receive this baseline fuel consumption data periodically such as once per second or more than once per second. The baseline fuel consumption data are transmitted from the telematic device 30 to the computer 16 as previously described throughout the first time period.

At the end of the first time period, at least one operating parameter is modified for the second plurality of vehicles, at step 103. This modification step (at 103) is further illustrated schematically in FIG. 3. Modifying an operating parameter may include changing one or more vehicle lubricants used in the second plurality of vehicles (step 103a). Modifying an operating parameter may also include activating a driver mentoring program in the driver mentoring device 32 installed in the second plurality of vehicles (step 103b), changing a gear oil in front and rear differentials of the second plurality of vehicles (step 103c), applying a fuel additive to the second plurality of vehicles (step 103d), changing a transmission fluid used in the second plurality of vehicles (step 103e), or changing a grease used in the second plurality of vehicles (step 103f), such as an engine grease. It will be understood that any combination of the foregoing operating parameters may be modified such that a single product may be tested for fuel efficiency improvements (e.g., an engine oil alone), or a combination of products may be tested for their combined effect on fuel efficiency (e.g., a different engine oil, gear oil, and activation of driver mentoring, in combination). Additionally, the operating parameters shown in FIG. 3 are not an exhaustive list of operating parameters that may be modified after the first time period. In any event, the same operating parameters changed in the second plurality of vehicles is not changed in the first plurality of vehicles. As a result, the first plurality of vehicles is a control group for the fuel efficiency analysis while the second plurality of vehicles is a test group for the fuel efficiency analysis.

In embodiments of the method 100 where the engine oil is changed as a part of modifying the operating parameters of the vehicles 12, the engine oil is changed using a "single flush" procedure. The single flush procedure includes bringing a vehicle 12 into an oil-changing shop after a designated warm-up period such as 10 minutes or 20 miles. The original engine oil is then drained, a new oil filter is installed, and the engine 20 is filled with the new engine oil being tested by the method 100. The warm-up period is repeated and then the vehicle 12 is brought back into the shop, where the engine oil is drained again. Another new oil filter is installed and the engine 20 is refilled once again with the new engine oil being tested. As is well known in the art, some vehicle engines 20 keep up to 20% of the original engine oil in the engine 20 when the engine oil is drained out. Thus, the single flush procedure ensures that a high percentage (e.g., more than 95%) of the conventional or previous engine oil used during the first time period is removed from the engine 20 by draining the engine oil twice after a warm-up period where the oil moves throughout the engine 20. Similarly, in embodiments of the method 100 where the gear oil is changed as a part of modifying the operating parameters of the vehicle, the gear oil may be changed using the single flush procedure explained above as to engine oil.

In embodiments of the method 100 where the driver mentoring program is activated in the driver mentoring device 32, the driver mentoring program can provide active feedback and instruction to modify one or more types of fuel-wasting behaviors. For example, the driver mentoring program can monitor the speed of the vehicle 12 and provide warnings anytime the speed of the vehicle exceeds the local speed limit by 5 miles per hour, or anytime the speed of the vehicle exceeds a predetermined speed limit such as 70 miles per hour. For every 5 miles per hour over the speed limit, typical vehicles burn up to 10% more fuel during operation, so reducing those occurrences with the driver mentoring program will increase fuel efficiency. In another example, the driver mentoring device can monitor engine idling that occurs for longer than a predetermined time period, such as two minutes. Leaving an engine idling for a period longer than 15 seconds typically wastes more fuel than stopping and restarting the engine, so reducing those occurrences with the driver mentoring program will also increase fuel efficiency. It will be appreciated that the driver mentoring program can be activated to address these and other types of wasteful driving behaviors throughout the second time period in the second plurality of vehicles.

After the chosen operating parameters have been modified, a "test phase" or second time period begins. During the second time period, the telematic devices 30 collect test fuel consumption data broadcast by the engine control modules 28 of the first and second pluralities of vehicles, at step 104. Similar to the first time period, the engine control module 28 broadcasts fuel flow rate information from the fuel injectors 22 and information on distance traveled to the telematic device 30 such that fuel consumption or fuel efficiency during the second time period may be determined for each vehicle 12. The second time period generally has a length equivalent to the length of the first time period so that the amount of fuel consumption data collected during the baseline phase and the test phase is roughly equivalent. The test fuel consumption data is transmitted from the telematic device 30 to the computer 16 as previously described throughout the second time period.

In addition to the selection of consistent drivers, vehicle configurations, delivery routes, and loads, regular maintenance records are also maintained during the first and second time periods, at step 105. The regular maintenance records allow the testing person or company to ensure that standardized fleet maintenance requirements have been met for every vehicle 12 in the first and second plurality of vehicles. This consistency ensures that most statistical outliers caused by human error are removed from the analysis of the data described in further detail below. The fleet maintenance requirements include following the original equipment manufacturer (OEM) specifications for equipment maintenance, maintaining tire pressures per Department of Transportation (DOT) guidelines, and conducting regular oil changes at 30,000 mile maximum intervals in embodiments where the engine oil is one of the operating parameters being modified. In some embodiments, a plurality of lubricant samples from the engine 20 may be collected at various intervals for further analysis by the testing person or company.

The regular maintenance records maintained during the baseline phase and the testing phase include initial mileage, dates and mileages of all lubricant samples and oil changes, and dates, mileages, and amounts of all fluid top-offs when necessary. The regular maintenance records also include an accurate record of any significant mechanical issues during the first or second time periods including coolant leaks, breakdowns, and other engine failures. The regular maintenance records must also include tire maintenance records, especially in the undesirable situation when a tire has to be changed during the performance of the method. Driver records must also be kept, especially when driver changes occur during the first or second time periods. As discussed previously, these regular maintenance records validate and assist the analysis of fuel consumption data, as well as ensure that all test protocols have been adequately followed.

In embodiments where lubricant samples are collected as part of keeping the regular maintenance records, these samples are collected from each vehicle 12 in the first plurality of vehicles at the beginning of the baseline phase, at any oil change during the first and second time periods, and at the end of the test phase. The samples are collected from each vehicle 12 in the second plurality of vehicles at all the same instances listed above for the first plurality of vehicles. In addition, lubricant samples are collected from the second plurality of vehicles during the first drain of engine oil in the single flush procedure, during the second drain of engine oil in the single flush procedure, during the first drain of gear oil in the single flush procedure, and after the single flush procedure is completed for both engine oil and gear oil. The plurality of lubricant samples may be analyzed with the fuel consumption data to provide further conclusions to fleet owners and operators.

At the end of the second time period, the entirety of the baseline fuel consumption data and the test fuel consumption data is analyzed to determine if any fuel efficiency improvements occurred as a result of modifying the operating parameters of the second plurality of vehicles, at step 106. In one example, the computer 16 calculates a daily average fuel efficiency for each vehicle 12 in both pluralities of vehicles for each day in the first and second time periods. Then for each vehicle 12, either a median or a mean fuel efficiency is selected from the daily averages of the baseline period and the daily averages of the test period. Therefore, a generalized difference in fuel efficiency can be established for each vehicle 12 from the first time period to the second time period.

Continuing the example, the control group or first plurality of vehicles may experience an average decrease in fuel efficiency of 0.03 miles per gallon from the first time period to the second time period, while the test group or second plurality of vehicles may experience an average increase in fuel efficiency of 0.22 miles per gallon from the first time period to the second time period. The difference in average changes of fuel efficiency from the test group and the control group provides the total difference in fuel efficiency, which would be 0.25 miles per gallon in the hypothetical example. As readily understood, analyzing the control group of vehicles 12 ensures that any increase or decrease in total fuel efficiency caused by uncontrollable variables such as vehicle component degradation (e.g., tire wearing) or weather changes is effectively eliminated from the test results. Regardless of the exact statistical method used by the computer 16 to analyze the fuel consumption data, the analysis will always result in a total difference in fuel efficiency.

After the analysis of the fuel consumption data produces a total difference in fuel efficiency caused by modifying the selected operating parameters, the detected fuel efficiency improvements are reported to the fleet owner or operator using the Return-On-Investment (ROI) Calculator 18, at step 107. One exemplary embodiment of a ROI Calculator 18 is illustrated in FIG. 4. The ROI calculator 18 receives the detected fuel efficiency improvement (2.8% in the example of FIG. 4) and converts that fuel efficiency improvement into a potential package savings per year for that fleet owner or operator, assuming that all vehicles in the fleet adopt the modified operating parameters from the method 100. As shown in the exemplary embodiment of the ROI Calculator 18, numerous factors are considered in this calculation of potential package savings, including the number of vehicles in the fleet, the amount of travel annually for the vehicles, the comparative costs and replacement intervals of conventional products and test products, and current fuel costs. The ROI Calculator 18 provides an indication of the financial bottom-line cost savings if the modified operating parameters are adopted, which is typically the most important information for a fleet owner or operator. In the exemplary embodiment illustrated, the modified operating parameters include a new engine oil, a new gear oil, and a driver mentoring program, which the method 100 determined caused a 2.8% increase in fuel efficiency and a "potential package savings" per year of over $25,000 in the first year for a 100 vehicle fleet.

In order to ensure that the fuel efficiency improvements detected by the method 100 are repeatable and statistically-significant, the total number of vehicles in the first and second plurality of vehicles and the total length of the first and second time periods are selected according to the following statistical analysis. In short, the first plurality of vehicles typically includes 10-20 vehicles, and more specifically 15 vehicles. The second plurality of vehicles also typically includes 10-20 vehicles, and more specifically 15 vehicles. The total length of the first and second time periods can range from 90-150 days, and each of the first and second time periods can define a length of 60 days (total 120 days) in an exemplary embodiment of the method 100. These values have been selected such that statistically-significant fuel efficiency improvements are determined at a 95% confidence level, which is the industry standard, with a Power level of at least 0.6 (assuming typical data variability and the assumed value of real fuel efficiency improvement). This procedure ensures that statistically-significant fuel efficiency improvements are detected at least 60% of the times the method 100 is performed.

Selection of the total length or duration of the first and second time periods is based primarily on two sets of competing considerations. First, the time period must be long enough to ensure that enough data are collected by the telematic devices to conduct the analysis of fuel efficiency improvements, and also to eliminate any distortion of the results caused by the natural human tendency to initially modify behavior when knowingly observed (i.e., when the telematic devices are first installed in the vehicles). Second, the time period must be short enough to limit total costs of performing the method and to limit distortion of the results by other factors such as driver changes, delivery route changes, engine malfunctions, and tire changes, each of which become more likely as the test period lengthens. Setting each time period to 60 days has proven to be a reasonable compromise between these competing considerations in initial performances of the method 100. If the time period is set to fewer than 45 days in each time period, not enough data are collected to overcome distortion of the results caused by modified driver behaviors. If the time period is set to greater than 75 days in each time period, the increase in marginal costs for performing the method provide only diminishing returns in statistically-significant results. Consequently, the total length of the first and second time periods should be in the range of 90-150 days. The duration of the first and second time periods may also be determined using the statistical analysis explained in detail below as to the test sample size, and as understood in the art.

The analysis conducted by the method 100 described above is based upon the statistical concept of a 1-sided, 2-sample t-test, which defines the confidence level that can be asserted when determining that the average of one population of data is different than another population of data. In the method 100, the first population of data refers to the detected fuel efficiency improvements in the control group of vehicles, or the first plurality of vehicles. The second population of data refers to the test group of vehicles, or the second plurality of vehicles. As well understood in statistics, the 1-sided, 2-sample t-test is designed to test and prove one of the following hypotheses (where $\mu_1$ is the population mean of the control group and $\mu_2$ is the population mean of the test group):

Null Hypothesis: "$\mu_2 = \mu_1$" or "$\mu_2 - \mu_1 = 0$"

Alternative Hypothesis: "$\mu_2 > \mu_1$" or "$\mu_2 - \mu_1 > 0$"

The goal of the method 100 is to detect and prove statistically significant differences in fuel efficiency caused by modifications to operating parameters of a vehicle, which means that the goal in the statistical analysis is to prove the Alternative Hypothesis that the test group of vehicles had a higher fuel efficiency improvement in the test phase than the control group of vehicles. The Power (or sample size) of the experimental design is determined by choosing any four of the following five interrelated factors: sample size of the test and control group vehicles, confidence level of the test, standard deviation of the populations, Power that is desired for the test, and the difference $\Delta$ that should be detected by the test (i.e., $\mu_2 - \mu_1 = \Delta$ = the difference). The confidence level is defined as $(1-\alpha)$, where $\alpha$ refers to the "Type I" error rate or the likelihood that the Null Hypothesis will be rejected when the Null Hypothesis is actually true (i.e., suggesting that there is a fuel efficiency improvement when there is not fuel efficiency improvement). The Power level is defined as $(1-\beta)$, where β refers to the "Type II" error rate or the likelihood that the Null Hypothesis will not be rejected when the Alternative Hypothesis is true (i.e., suggesting that there is no significant fuel efficiency improvement when there is fuel efficiency improvement). For the method 100 to be "statistically significant" and of high value to a fleet owner and operator, both types of errors must be minimized. In other words, the confidence level and the Power level of the method 100 should be as high as possible such that statistically significant detection of fuel efficiency improvements is ensured over a high percentage of method performances.

However, the confidence level and the Power level of the method 100 increases with increasing sample size. In this regard, a test statistic Z is set using the following formula, where σ is the population standard deviation, N is the sample size for each group of vehicles, $X_{1bar}$ is the sample mean of the control group (corresponds to $\mu_1$) and $X_{2bar}$ is the sample mean of the test group (corresponds to $\mu_2$):

$$Z=(X_{1bar}-X_{2bar})/(SQRT(2)*\sigma/SQRT(N))$$

The test statistic can then be used to calculate the Power level of the statistical analysis. To summarize and simplify this conventional statistics calculation, a first test statistic $Z_\alpha$ is defined which increases with an increasing level of confidence, and a second test statistic $Z_\beta$ is defined which decreases with an increasing Power level. The five interrelated factors of the Z-test can then be expressed by the following formula for determining the sample size:

$$N=2*(Z_\alpha-Z_\beta)^2/(\Delta/\sigma)^2$$

Again, it will be appreciated that the sample size N necessarily increases with the confidence level and the power. The number of vehicles 12 used in the first plurality and second plurality of vehicles is limited because each additional vehicle 12 added to the test adds more upfront costs and more time investment for the fleet owner or operator. Consequently, the relationship between sample size N and Power (or confidence level) is subject to the competing considerations of limiting total costs to perform the method 100 and obtaining statistically significant results with the method 100.

Applying this statistical analysis to the method 100 described above, in one example, laboratory testing may show that a conservative estimate for fuel efficiency improvements when making a selected modification to operating parameters is 3%. For a vehicle 12 that averages about 6.0 miles per gallon, the difference to detect (Δ) is thus 0.18 miles per gallon of fuel efficiency improvement. Considering the test procedures (i.e., maintenance records, etc.) in place to ensure consistency in the data collected, a conservative estimate for standard deviation of a typical fuel efficiency analysis (i.e., the standard deviation of the difference of 60-day fuel economy averages) is 0.2 miles per gallon. If the confidence level is set at the industry standard of 95%, the only remaining variables are the sample size and the Power. Therefore, the relationship between the sample size and the Power may be plotted graphically to determine an appropriate sample size and Power to select for the method 100. A graphical plot of Power over detected difference (Δ) for sample sizes ranging from 5 to 20 is illustrated in FIG. 5.

Figure 5:
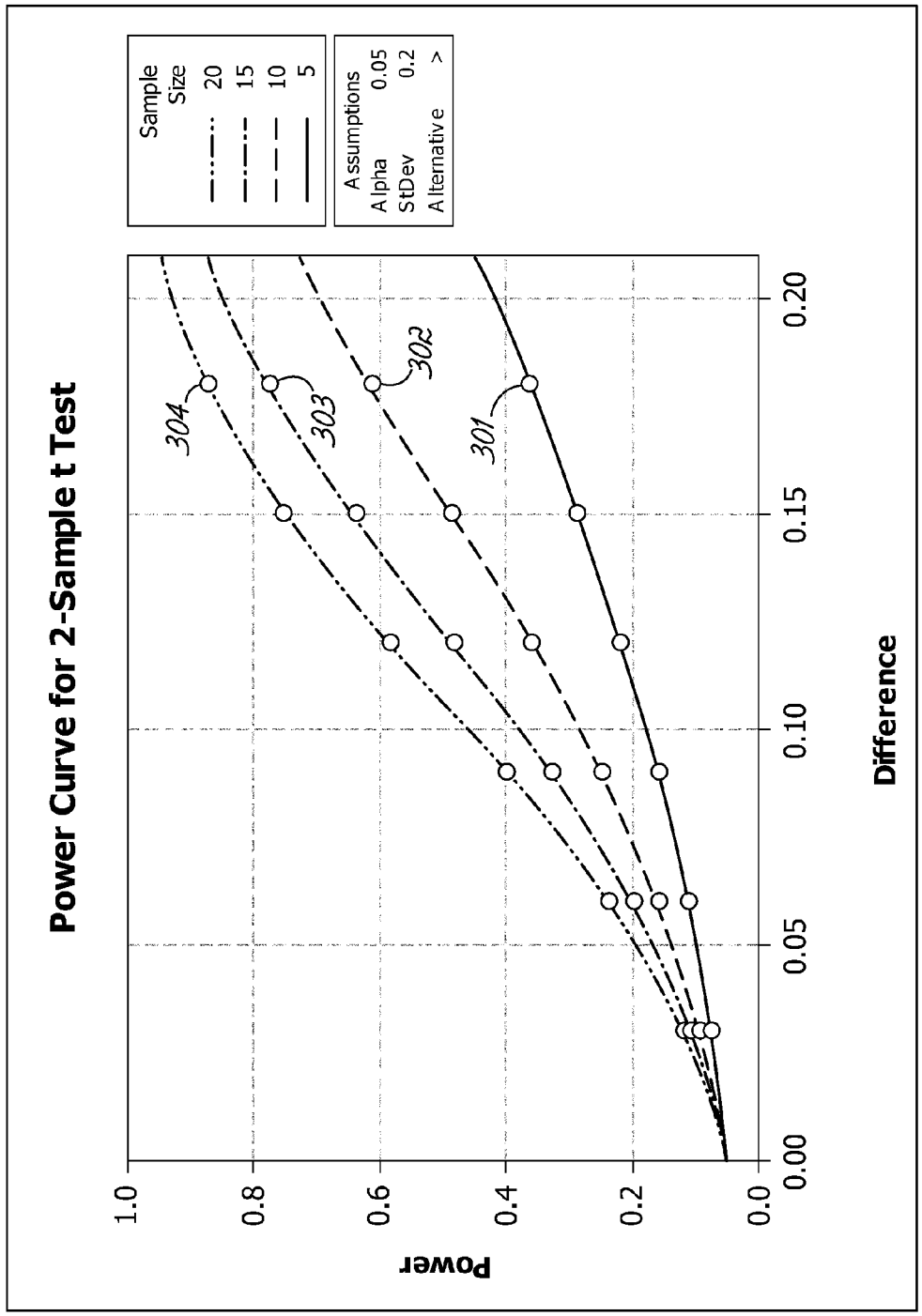
FIG. 5 is a graph of Power curves for evaluating the analysis performed in the method of FIG. 2, the Power curves depending on sample size.

From this plurality of so-called "Power curves" in FIG. 5, the relationship between Power and sample size may be determined by observing the data points on each Power curve at a specified Δ, which is 0.18 miles per gallon in the current example. Thus, for a sample size of 5 vehicles per group, the Power is about 0.37 at the specified Δ (at point 301), which means there is only a 37% likelihood that the test results will reject the Null Hypothesis when the Alternative Hypothesis is true. If the sample size is increased to 10 vehicles per group, the Power increases to just above 0.6 (at point 302). If the sample size is increased to 15 vehicles per group, the Power increases to about 0.78 (at point 303). If the sample size is increased to 20 vehicles per group, the Power increases to about 0.85 (at point 304). Thus, it is clear that increases in Power are subject to diminishing returns as more vehicles are added to each group, especially above 15 vehicles in each group. As such, 15 vehicles per group are used in the described method 100 to ensure statistically significant results 78% of the time in the proposed example. It will be appreciated that if a set Power level were desired such as 0.6 or 60%, then the numbers of vehicles used in each group could be set to any number of vehicles above the minimum number necessary to achieve the 0.6 power level (i.e., 10 vehicles in FIG. 5). In this regard, the number of vehicles used in each of the first and second pluralities of vehicles could be 10-20 vehicles to obtain a Power level of 0.6.

Figure 6:
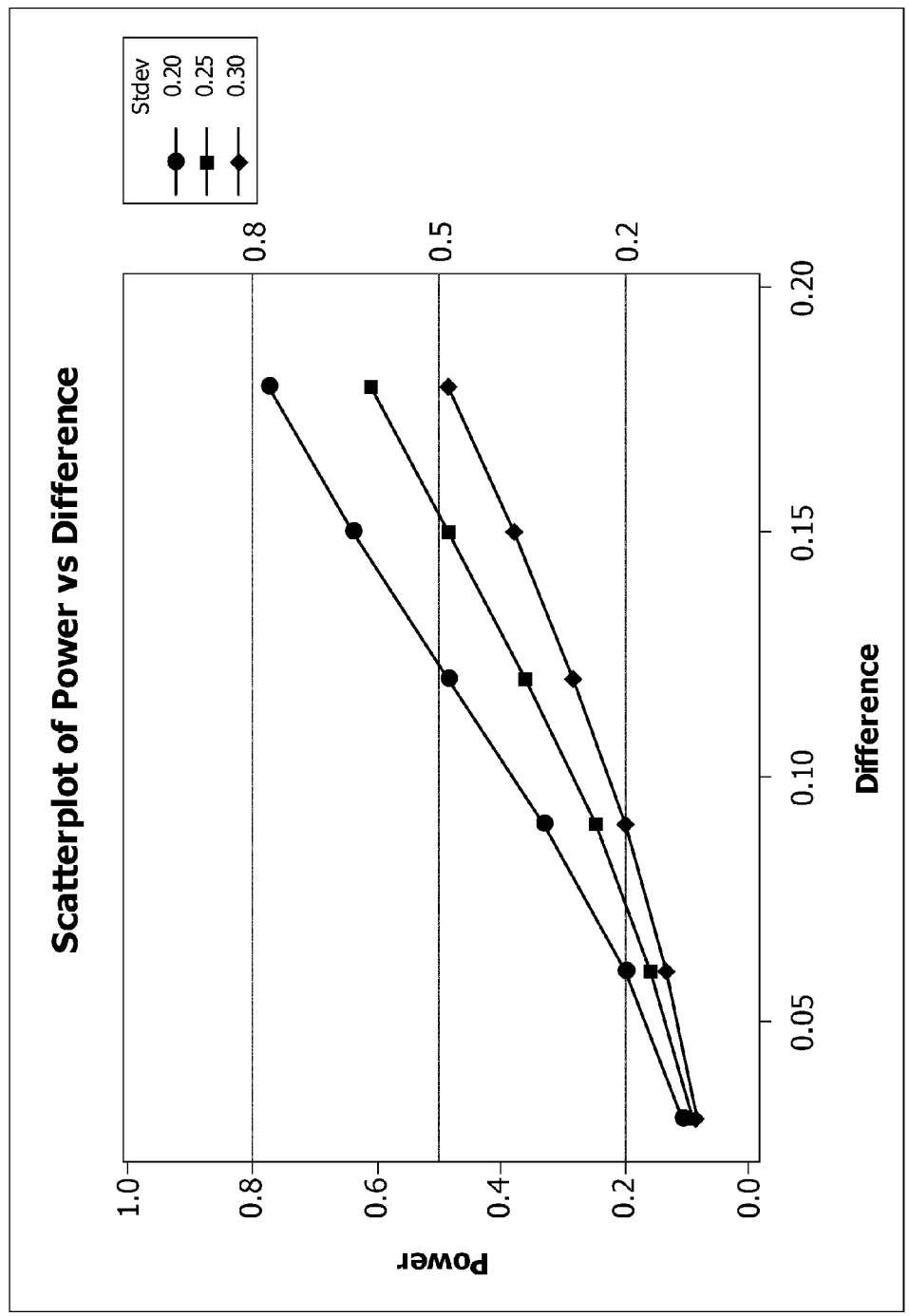
FIG. 6 is a graph of Power curves for evaluating the analysis performed in the method of FIG. 2, the Power curves depending on standard deviation.
Figure 7:
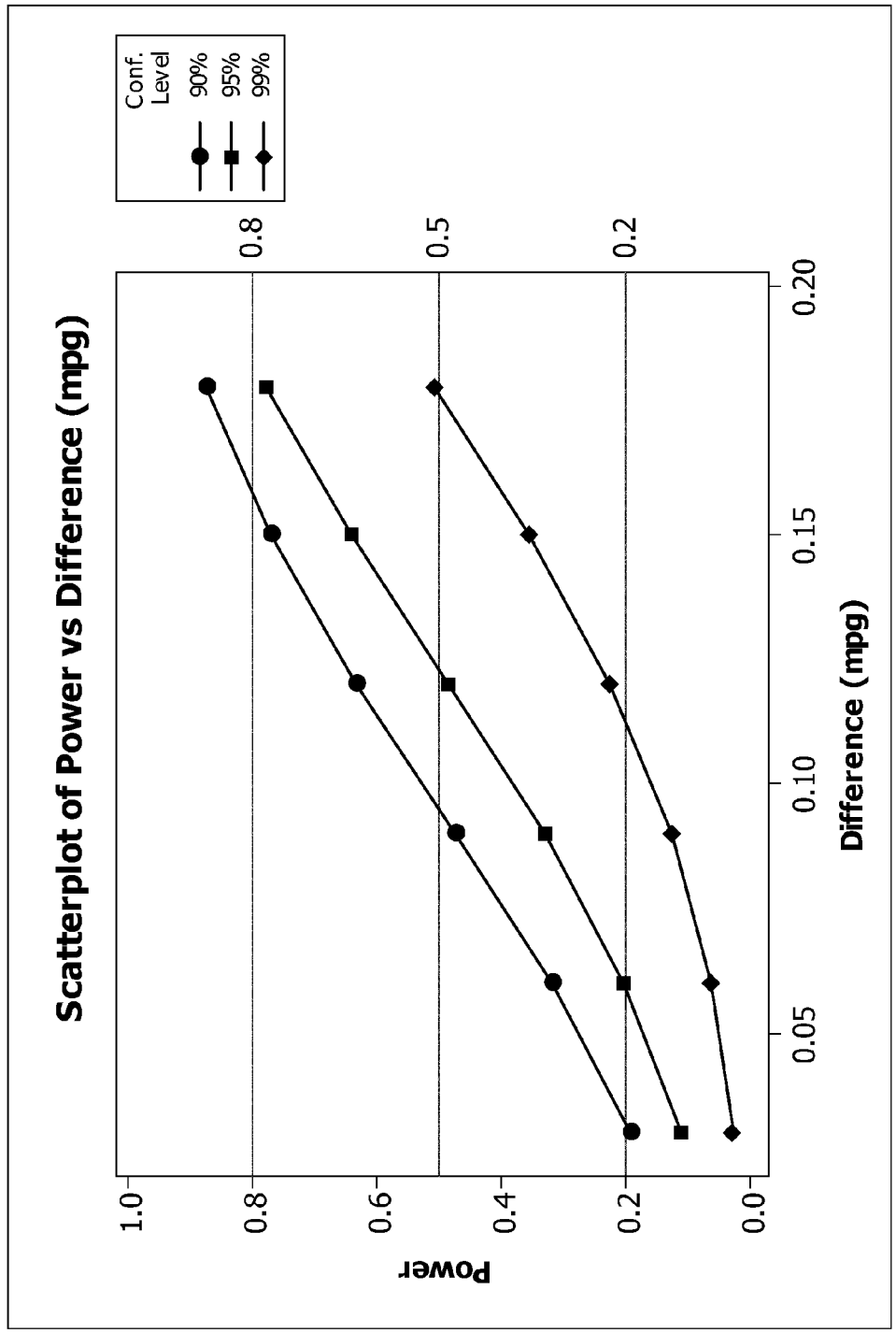
FIG. 7 is a graph of Power curves for evaluating the analysis performed in the method of FIG. 2, the Power curves depending on confidence level desired.

Although varying standard deviations and confidence levels are not considered in the plot of FIG. 5, those factors also affect the Power curves as readily understood from the formulas above. FIG. 6 illustrates various Power curves for different standard deviations. Note that the Power level at a detected difference Δ of 0.18 miles per gallon drops from 0.78 to about 0.6 if the standard deviation σ increases to 0.25 miles per gallon, and further drops to about 0.48 if the standard deviation σ increases to 0.30 miles per gallon. These Power curves illustrate the high importance of maintaining consistency throughout both pluralities of vehicles as well as over the entire first and second time periods. FIG. 7 illustrates various Power curves for different confidence levels. Again referring to the data points provided around 0.18 miles per gallon of detected difference Δ, the Power decreases substantially to about 0.5 (from 0.78) if the confidence level desired is 99%, while the Power increases to about 0.85 if the confidence level desired is 90%. Consequently, the statistical analysis may be modified for each specific test of operating parameters to be modified, as understood in the art.

Figure 8:
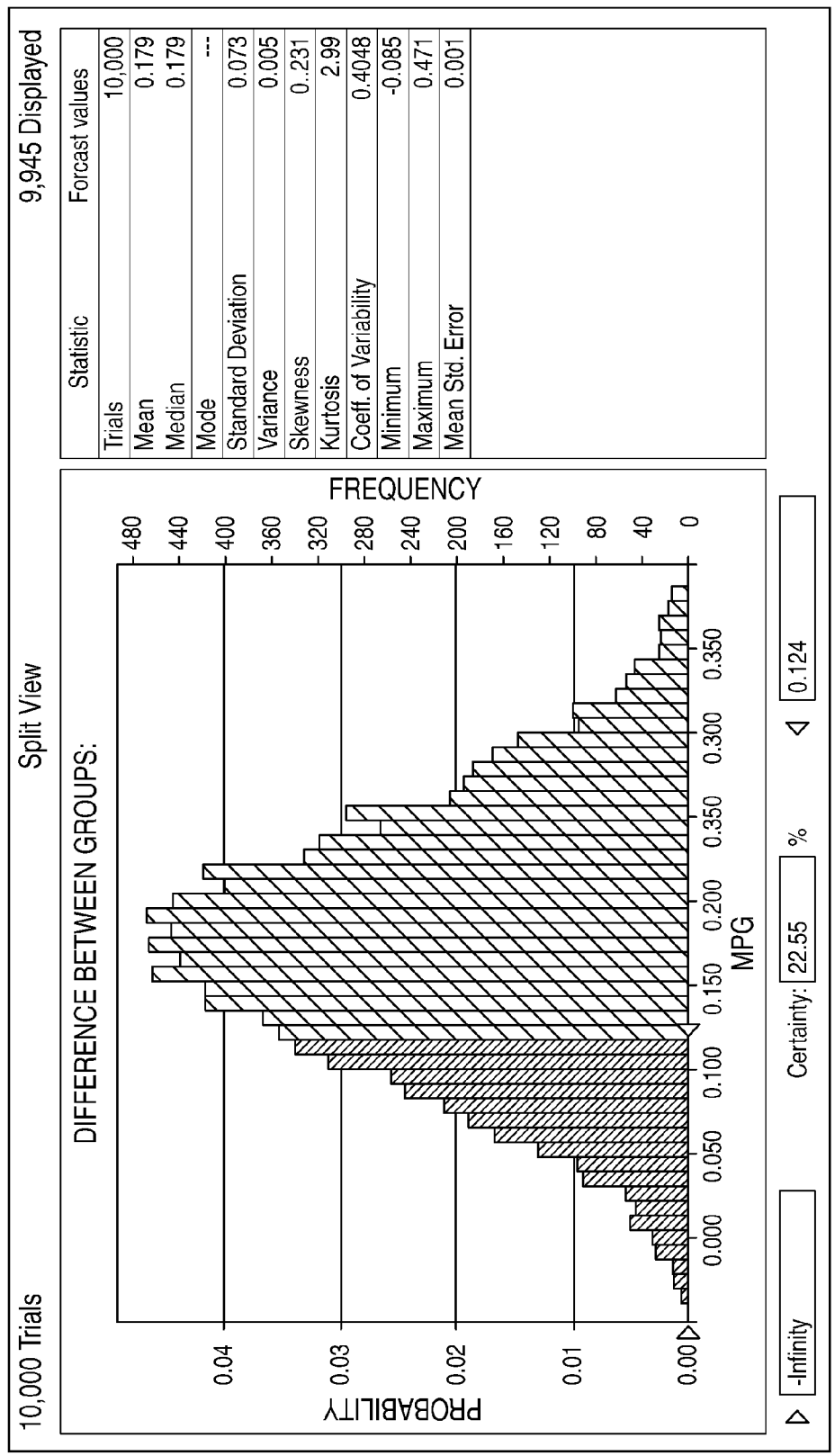
FIG. 8 is a pictorial representation of a Monte Carlo Simulation of the method of FIG. 2, the Monte Carlo Simulation configured to illustrate the variability of results obtained when performing the method.

After choosing 15 vehicles as the sample size in the example, a Monte Carlo Simulation may be performed on the method 100 to further quantify the results a fleet owner or operator is likely to receive when performing the method 100. The Monte Carlo Simulation is understood in statistics to be a computer-generated simulation of results obtained when a test or method is performed a high number of times, such as 10,000 times. The Monte Carlo simulation of the exemplary embodiment assumes the following facts: (i) that the actual fuel efficiency improvement in the control group or first plurality of vehicles is zero, (ii) the actual fuel efficiency improvement in the test group or second plurality of vehicles is 0.18 miles per gallon, and (iii) the standard deviation σ is 0.2 miles per gallon. The Monte Carlo simulation then randomly generates data sets conforming generally to these parameters and essentially performs the method 10,000 or more times. FIG. 8 illustrates a summary or distribution of each test result (i.e., the fuel efficiency improvement or difference detected) using the parameters specified in the example above. The test results show that variability in the fuel consumption data may lead to detected fuel efficiency improvements ranging all the way from −0.09 miles per gallon (a decrease in fuel efficiency) to 0.47 miles per gallon. As expected, most of the results are much closer to the actual fuel efficiency improvement of 0.18 miles per gallon than either extreme.

FIG. 8 also illustrates by shading the amount of test results that are statistically significant. In this regard, the lighter-shaded test results reject the Null Hypothesis at a 95% confidence level, and these test results occur about 78% of the time, which is consistent with the Power level. About 21% of the time (more heavily shaded in FIG. 8), a positive test result indicating a fuel efficiency improvement is detected, although these test results are not large enough to reject the Null Hypothesis at a 95% confidence level. Only 1% of the time will the test results provide a false negative result, which means that for the example modifications to the operating parameters, the method 100 will provide a positive result 99% of the time and a statistically significant positive result 78% of the time. Thus, the fuel efficiency improvements are generally ensured to be statistically significant.

Figure 9:
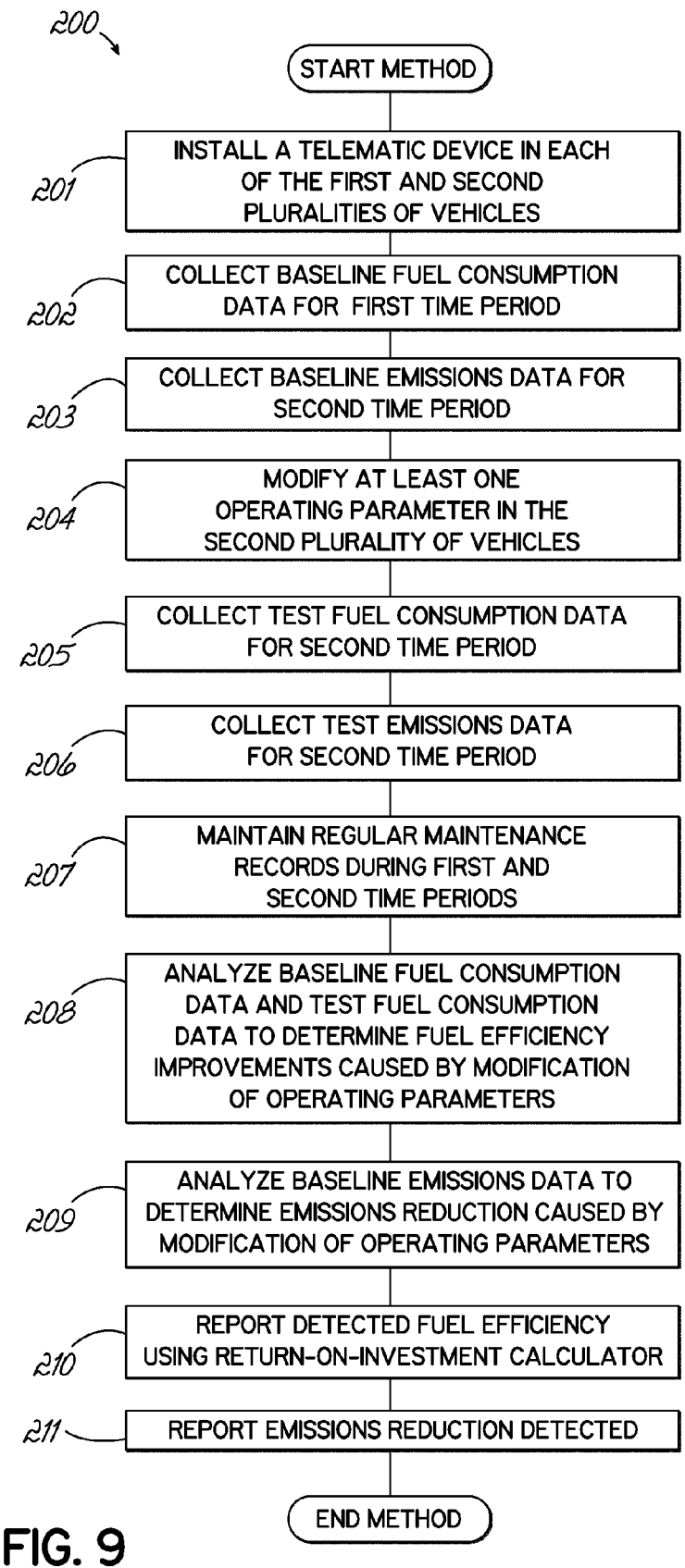
FIG. 9 is a flowchart illustrating another embodiment of the method performed by the system of FIG. 1.

FIG. 9 schematically illustrates an alternative embodiment of the method 200 operated by the system 10. The method 200 again begins with installing the telematic devices 30 into each of a first plurality of vehicles and a second plurality of vehicles, at step 201. The baseline fuel consumption data is collected for the first and second pluralities of vehicles over a first time period, at step 202. The telematic devices 30 also receive emissions data from emissions sensors 24 of the engine 20 (or other emissions sensors as well understood in the art), and the method 200 further includes collecting baseline emissions data for the first time period, at step 203. Similar to the previous embodiment, at least one operating parameter is modified in each of the second plurality of vehicles, at step 204, and then test fuel efficiency data are collected for the first and second pluralities of vehicles over a second time period, at step 205. The method 200 of the present embodiment also includes collecting test emissions data for the second time period, at step 206. Just like the previous embodiment, regular maintenance records are maintained during the first and second time periods, at step 207.

Then, at step 208, the baseline fuel consumption data and test fuel consumption data are analyzed to determine fuel efficiency improvements caused by the modification of operating parameters. In a similar manner, the baseline emissions data and test emissions data are also analyzed to determine emissions reduction caused by the modification of operating parameters, at step 209. The fuel efficiency improvements are reported using the Return-On-Investment Calculator, at step 210, while the emissions reduction is reported separately, at step 211. It will be understood that analogous collection, analyzing, and reporting steps may be added to additional embodiments of the method based on data received by the engine control module 28 from other sensors 26 in the engine 20. As a result, the method of the present invention is configured to provide statistically significant detection of any important result caused by a modification of operating parameters in a plurality of vehicles, including the example of emissions described herein.

While the present invention has been illustrated by the description of the embodiments thereof, and while these embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details and illustrative examples shown and described. Accordingly, departures may be made from such details without departure from the spirit or scope of applicants' general inventive concept.

The invention claimed is:

1. A method for testing and proving fuel efficiency improvements caused by a modification of at least two operating parameters in a vehicle, the method comprising:
   installing a telematic device in each of a first plurality of vehicles and in each of a second plurality of vehicles, each telematic device configured to receive fuel consumption data broadcast by a vehicle's engine control module;
   collecting baseline fuel consumption data for the first and second pluralities of vehicles during a first time period, the first time period acting as a baseline or control period;
   modifying the at least two operating parameters in only the second plurality of vehicles after the first time period and during a second time period, such that the first plurality of vehicles acts as a control group;
   collecting test fuel consumption data for the first and second pluralities of vehicles during the second time period; and
   analyzing baseline fuel consumption data and test fuel consumption data for the first plurality of vehicles and the second plurality of vehicles to determine fuel efficiency improvements in the second plurality of vehicles caused by modifying the at least two operating parameters,
   wherein modifying the at least two operating parameters includes changing one or more vehicle lubricants used in the second plurality of vehicles.

2. The method of claim 1, wherein a total number of vehicles in the first and second pluralities of vehicles and a total length of the first and second time periods are selected to ensure that statistically-significant fuel efficiency improvements are determined at a 95% confidence level and a Power level of at least 0.6.

3. The method of claim 2, wherein the total number of vehicles in the first and second pluralities of vehicles is between 20 and 40 vehicles.

4. The method of claim 3, wherein the first plurality of vehicles includes 15 vehicles and the second plurality of vehicles includes 15 vehicles.

5. The method of claim 2, wherein the total length of the first and second time period is between 90 and 150 days.

6. The method of claim 5, wherein the first time period defines a length of 60 days and the second time period defines a length of 60 days.

7. The method of claim 1, further comprising:
   reporting the detected fuel efficiency improvements as a total fuel cost savings per year using a Return-On-Investment calculator, wherein the Return-On-Investment calculator includes input fields for number of trucks, annual travel distance, current fuel cost, and engine oil change mileage interval, to thereby enable reporting of the total fuel cost savings per year for different fleets of trucks.

8. The method of claim 1, wherein changing the one or more vehicle lubricants includes changing an engine oil used in the second plurality of vehicles by a single-flush changeover comprising:
   draining used engine oil from the corresponding engine;
   flushing the engine by filling the engine with new engine oil and draining the new engine oil from the engine; and
   filling the engine with new engine oil again.

9. The method of claim 1, further comprising:
   maintaining regular maintenance records for each vehicle in the first and second pluralities of vehicles during the first and second time periods.

10. The method of claim 1, wherein the telematic devices collect fuel consumption data by receiving fuel flow rates through fuel injectors in the corresponding engines, as monitored by the engine control modules.

11. The method of claim 10, wherein the telematic devices collect fuel consumption data at least once per second.

12. The method of claim 1, wherein each telematic device configured to collect fuel consumption data further includes a driver mentoring device, and wherein modifying the at least two operating parameters further includes activating a driver mentoring program with the driver mentoring device in each of the second plurality of vehicles.

13. The method of claim 1, wherein modifying the at least two operating parameters further includes changing a gear oil used in the second plurality of vehicles.

14. The method of claim 1, wherein modifying the at least two operating parameters further includes applying a fuel additive to the second plurality of vehicles.

15. The method of claim 1, wherein modifying the at least two operating parameters further includes changing a transmission fluid used in the second plurality of vehicles.

16. The method of claim 1, wherein modifying the at least two operating parameters further includes changing a grease used in the second plurality of vehicles.

17. The method of claim 1, wherein each telematic device collects additional data regarding engine performance from the engine control module of the corresponding vehicle.

18. The method of claim 17, further comprising:
collecting emissions data during the first time period;
collecting emissions data during the second time period; and
analyzing the emissions data for the first plurality of vehicles and the second plurality of vehicles to determine emissions improvements in the second plurality of vehicles caused by modifying the at least two operating parameters.

19. A method for testing and proving fuel efficiency improvements caused by a modification of at least one operating parameter in a vehicle, the method comprising:

installing a telematic device in each of a first plurality of vehicles and in each of a second plurality of vehicles, each telematic device configured to receive fuel consumption data broadcast by a vehicle's engine control module;
collecting baseline fuel consumption data for the first and second pluralities of vehicles during a first time period;
modifying the at least one operating parameter in the second plurality of vehicles after the first time period and during a second time period while maintaining the at least one operating parameter the same in the first plurality of vehicles after the first time period and during the second time period;
collecting test fuel consumption data for the first and second pluralities of vehicles during the second time period; and
analyzing baseline fuel consumption data and test fuel consumption data for the first plurality of vehicles and the second plurality of vehicles to determine fuel efficiency improvements in the second plurality of vehicles caused by modifying the at least one operating parameter, the fuel efficiency improvements being determined by subtracting any modifications of the fuel consumption data for the first plurality of vehicles, acting as a control group, from any modifications of the fuel consumption data for the second plurality of vehicles during the second time period,
wherein modifying the at least one operating parameter includes changing one or more vehicle lubricants used in the second plurality of vehicles.

* * * * *

UNITED STATES PATENT AND TRADEMARK OFFICE
CERTIFICATE OF CORRECTION

PATENT NO. : 8,554,513 B2
APPLICATION NO. : 12/914414
DATED : October 8, 2013
INVENTOR(S) : Victor Lee Kersey et al.

It is certified that error appears in the above-identified patent and that said Letters Patent is hereby corrected as shown below:

In the Specifications

Column 9, line 15, "where a is the" should read --where σ is the--

Column 10, line 51, "the standard deviation a is" should read --the standard deviation σ is--

Signed and Sealed this
Fourth Day of March, 2014

Michelle K. Lee
*Deputy Director of the United States Patent and Trademark Office*